UNITED STATES PATENT OFFICE.

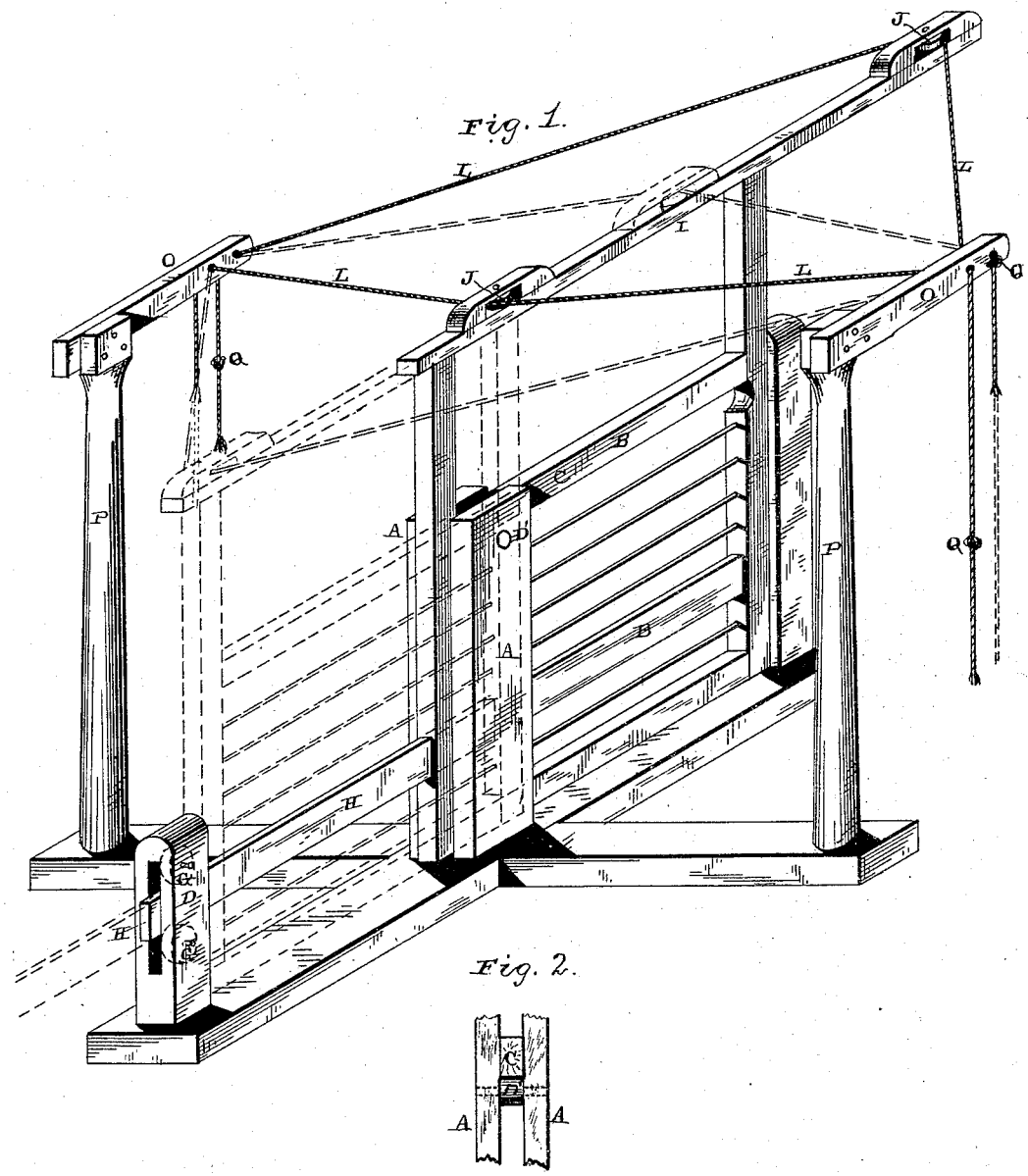

WILLIAM W. GRAVES, OF WHITESBOROUGH, TEXAS.

SLIDING GATE.

SPECIFICATION forming part of Letters Patent No. 317,765, dated May 12, 1885.

Application filed May 19, 1884. (No model.)

*To all whom it may concern:*

Be it known that I, W. W. GRAVES, of Whitesborough, in the county of Grayson and State of Texas, have invented certain new and useful Improvements in Sliding Gates; and I do hereby declare the following to be a full, clear, and exact description of the invention, such as will enable others skilled in the art to which it pertains to make and use it, reference being had to the accompanying drawings, which form part of this specification.

My invention relates to an improvement in sliding gates; and it consists in the combination of the two posts between which the gate moves back and forth, the roller placed between them and upon which the gate moves, the gate provided with an extension on its rear edge, a top rail, and pulleys on the top rail, a post provided with rollers, and through which the extension passes, operating-cords provided with stops, and the posts provided with guides for the ropes to pass through, as will be more fully described hereinafter.

The object of my invention is to construct a sliding gate and provide it with suitable operating cords, wires, or chains, by means of which the gate can be opened and closed without causing persons to dismount from their vehicles or horses for that purpose.

Figure 1 is a perspective of a gate embodying my invention. Fig. 2 is a detail view of the same.

A represents the two posts between which the gate B is supported in a vertical position in its movements back and forth. The bar C of the gate rests upon the friction-roller D', which is placed between the posts for the purpose of enabling the gate to move easily. At any suitable distance to the rear of these posts A is placed a smaller slotted post, D, in which are journaled two friction-rollers, G. Projecting from the rear edge of the gate is the extension or guide H, which passes between these rollers, and serves both to steady and guide the gate as it moves back and forth. The gate being supported upon a friction-roller between the two posts A, and being always kept in a line by the extension, can never sag or become displaced in any manner. The end bars of the gate project upward a suitable distance, and upon the tops of these bars is secured the rod I, which projects a suitable distance beyond the front edge of the gate. Upon this rod I are placed the friction-rollers J, around which pass the two operating cords, wires, or ropes L. The outer ends of these wires, ropes, or cords L are passed through suitable supports, O, which are secured to the upper ends of the posts P, placed at a suitable distance beyond the gate on each side. Each one of the ropes is provided with a knot or stop, Q, near each end, which serves to limit the sliding or endwise movement of the rope through the supports O. When a pull is exerted upon one end of one of the ropes, the rope slips endwise through the two supports O and past the roller J upon the top of the gate until the stop or knot Q upon the opposite end of the rope from that which is pulled strikes against its support, and then the pull that is exerted upon the rope at the opposite end is transferred to the gate for the purpose of opening or closing it, and this pressure causes the gate to move in the desired direction. When a corresponding pull is exerted upon the other rope, either at the same side or the opposite side of the gate, this pull causes the gate to move in the opposite direction.

The great advantage in a gate constructed as here shown consists in the simplicity of its parts, the cheapness of construction, and the fact that the parts will not readily get out of order.

I am aware that it is not new to operate a sliding and rolling gate by means of an operating cord or wire which is passed around guiding-rollers placed upon central guiding-posts and then around rollers placed upon opposite ends of the gate. I am also aware that it is not new to pass the inner ends of the operating cords or wires around suitable guiding rollers and then secure these inner ends directly to the gate, and these I disclaim.

Having thus described my invention, I claim—

The combination of the guiding and supporting posts A, and roller D', placed between them, the guiding-post D, also provided with rollers, and the posts P, having suitable guides for the ends of the ropes or wires to pass through, with the gate B, having the extension H, the top rail, I, and pulleys J, and the ropes L, having the stops Q, substantially as shown.

In testimony whereof I affix my signature in presence of two witnesses.

W. W. GRAVES.

Witnesses:
W. H. TROLINGER,
THOS. L. WADE.